United States Patent [19]
Killian

[11] 3,811,318

[45] May 21, 1974

[54] METHOD AND APPARATUS FOR DETERMINING PROGRESS OF A CHEMICAL REACTION OCCURING WITHIN BEADS IN A LIQUID SUSPENSION

[75] Inventor: Charles R. Killian, Baton Rouge, La.

[73] Assignee: Foster Grant Co., Inc., Leominster, Mass.

[22] Filed: Mar. 2, 1971

[21] Appl. No.: 120,240

[52] U.S. Cl. .................................. 73/61 R, 73/61.4
[51] Int. Cl. ............................................ G01n 15/04
[58] Field of Search ............. 73/61 R, 61.4, 61.1 R, 73/53, 421 B

[56] References Cited
UNITED STATES PATENTS

| | | | |
|---|---|---|---|
| 3,666,419 | 5/1972 | Cahour et al. | 73/61 R X |
| 2,982,170 | 5/1961 | Wyss | 73/61.1 R |
| 3,205,699 | 9/1965 | Van Assendelft | 73/53 X |
| 3,377,597 | 4/1968 | Muta | 73/432 PS X |
| 2,755,662 | 7/1956 | Swengel | 73/61 R X |

FOREIGN PATENTS OR APPLICATIONS 1,255,355  11/1967  Germany .......................... 73/64.1

Primary Examiner—Richard C. Queisser
Assistant Examiner—Joseph W. Roskos

[57] ABSTRACT

Polymerization reactions requiring suspension of the reactants as small particles within a suspending medium are examined for stability of the suspension by isolating samples at intervals during the process and determining rising or settling times for the suspended particles and correlating the separation time with the stability of the suspension system. A sample is obtained as by drawing it from a reaction chamber into a narrow tube which receives a transverse beam of ultra high frequency sonic waves and the transparency of the suspension is then measured at a correspondingly placed receiver for the ultrasonic waves. The interface between the dispersed phase and the dispersing medium moves up the tube at a rate which, when compared to a calculated safe rate, will indicate the stability of the suspension system and an automated rise time indicator and alarm effects a read-out corresponding to suspension stability varying as polymerization progresses.

13 Claims, 8 Drawing Figures

INVENTOR
CHARLES R. KILLIAN

BY Beveridge & De Grandi

ATTORNEYS

METHOD AND APPARATUS FOR DETERMINING PROGRESS OF A CHEMICAL REACTION OCCURING WITHIN BEADS IN A LIQUID SUSPENSION

This invention relates to monitoring and control of chemical processes and has particular application to polymerization reaction systems comprised of an inert medium having dispersed therein one or more monomeric reactants. The inert medium may be any suitable liquid immiscible with the suspended reactants. The invention has special reference to determining safe points in a reaction in which the reactants are suspended in an agitated, substantially inert medium and in which the suspension is so sensitive during a certain period of the reaction that a slight deviation from the ideal of one or more of several variables will cause the suspension to become unstable or fail. Such reactions are generally carried out in suspension to facilitate reaction temperature control and to minimize the energy input required to provide adequate agitation of the reaction mixture during the entire reaction, which energy input requirement normally increases, due to an increase in the viscosity of the reaction mixture, as the reaction proceeds towards completion. Chief among the several variables which must be carefully controlled to prevent suspension instability or failure are reaction temperature, degree of agitation, and type and amount of suspending systems used in the reaction. Failure of the suspension during the critical period usually results in agglomeration of the product into a solid mass that cannot readily be removed from the reactor. This results in the loss or expensive rehabilitation of the reaction vessels as well as loss of the product therein.

Reactions of the type described, taking place in globules of suspended reactant material, are heated or cooled by heat transfer between the suspended material and the suspending medium. The suspending medium is an aqueous liquid or other vehicle in which the reactant material is substantially insoluble. The term globules as herein used refers to the dispersed or suspended reactant material, usually in the form of spheres, as occurs when one liquid is dispersed in another with which it is immiscible. While the product of any herein concerned reaction, which tends to produce an unwanted agglomeration generally is in the form of solid beads separable from the suspending vehicle, it is to be understood that the globules gradually become solid, particularly during a polymerization reaction. The term particles is used interchangeably with globules or beads in reference to the suspended material. Liquid globules thus tend to become solid beads as the reaction proceeds, and either term may accordingly apply to the partially reacted material, and the terms as herein used, do not exclude particles other than spherical which may be present. The terms settling time or rise time as herein used refer to time for separation of suspended or dispersed phase material from the continuous phase, whether the globules rise or fall in the medium and whether the interface between accoustically clear vehicle and accoustically absorbent material rises or falls. Rise time is herein used to indicate a degree or rate of separation between phases of the suspension, as one phase always rises and the other phase settles in respect thereto. Separation time is the measured quantity whether the rising or settling aspect is considered, the term rise time being preferred in relation to the examples disclosed wherein the interface actually rises.

An example of separation time testing according to this invention is in the manufacture of polystyrene from styrene monomer. During final portions of the conversion from monomer to polymer the particles or beads of the reacting product have less tendency to agglomerate than they do during the earlier stages of the reaction when they are very soft and tacky. During the earlier stages the reaction must be carefully observed so that any tendency towards suspension instability can be quickly detected and compensated for.

It is well known that the rise time of the suspended beads in a stilled sample, that is, a sample of the reaction mixture that is removed from the reaction zone and allowed to stand without agitation, is an indication of the stability of a polymerization suspension. A rise rate faster than normal during the critical period indicates that the suspension is tending towards instability. A normal rise rate is, of course, determined by experience and it will vary as the system varies. Some of the major factors affecting the rise time of suspended polymerizing particles in a suspension medium are the particular monomer or mixture of monomers being polymerized, the ratio of monomer to suspending medium, the type and amount of non-polymeric components present in the polymerization system and the size of the suspended particles. It is accordingly helpful to monitor the particle rise time as the reaction proceeds so that the state of the suspension stability during the critical period is always known. A number of manual methods for obtaining rise time by withdrawing a sample and watching it have been employed, but these are generally not satisfactory for an automated process.

It is accordingly an object of this invention to provide an improved sampling method and an improved method of determining rise time (or settling time) in a suspension undergoing a chemical change such as a change from monomer to polymer. A further object of the invention is to provide an improved means for determining the position of an interface between a suspension and a portion of the suspending medium from which the particles have separated. A further object of the invention is to provide an improved means for detecting the presence of partially or completely polymerized particles in a suspension. A still further object of the invention is to provide a technique for obtaining rise time and employing this rise time as an automatic alarm actuator or a recording of the condition of a reaction from time to time during the progress of this reaction. These and other objects of the invention will be more clearly understood as the invention is described in connection with the drawings in which:

Briefly summarized, the invention is concerned with a method and means for periodically withdrawing samples from a reaction vat or isolating them in a quiescent zone in the reaction vat and determining the rise time or settling time according to whether the particles are of lower or higher specific gravity than the vehicle, by observing the time required for an interface formed by the rising particles to move past the point of observation established between a projector and receiver for ultrasonic vibrations when a sample has been isolated in a quiescent zone or withdrawn into a settling chamber from an agitated suspension of reacting particles within a vehicle.

Ultrasonic vibrations are employed of a frequency selected such that the difference in transmission through the suspension medium and the suspension is easily detected. When a sample has been obtained, the time for separation to a particular height in the same chamber indicates the strength of the suspension, the density and size of the particles in the system being known. A relationship is available to correlate the rise time with the specific gravity of the particles and in accordance with the particle size. If this rise time exceeds a predetermined limit established by test, a danger condition is indicated and may be represented by an alarm signal or by an immediate dumping of the reaction vessel if substantial agglomeration of the globules is threatened. When the reaction proceeds at a normal rate without danger of excessive agglomeration a rise time is automatically indicated.

Figure 1:
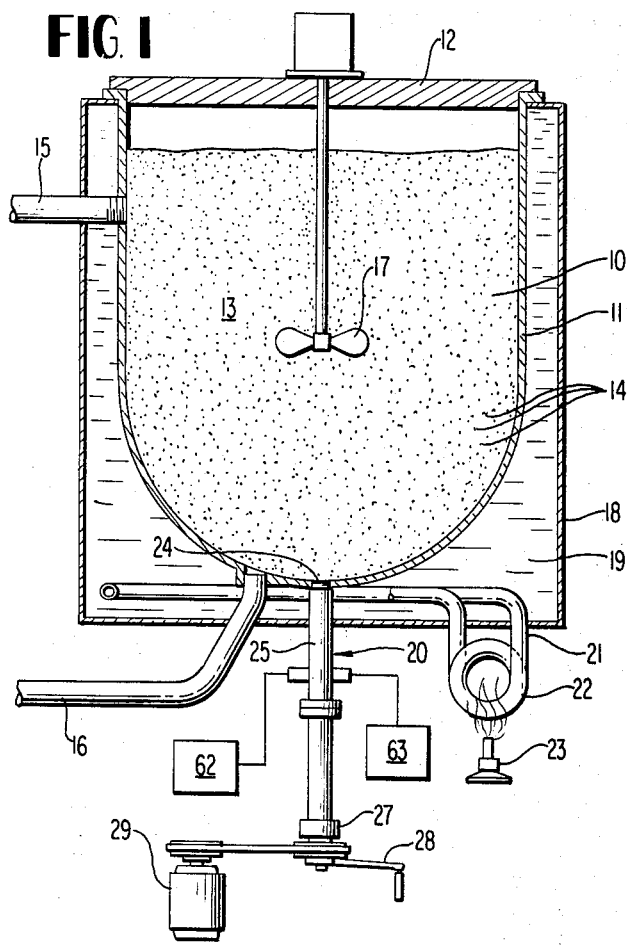
FIG. 1 is a diagrammatic showing of a reaction vat controlled as to temperature and having sampling means periodically actuatable to provide a rise time measurement.

Referring now to the drawings and more particularly to FIG. 1, a reaction vat or kettle 10 having wall 11 and a thermal insulating cover 12 is filled with a suspension of the reactants, usually in an aqueous vehicle, being in the form of globules dispersed with the aid of a wetting agent or a coupling agent which prevents rapid separation of the oily globules of reactant material from the aqueous vehicle. Conditions and circumstances may vary widely in the practice of this invention wherein it is desirable to continuously or repeatedly monitor the behavior of the reacting materials. Such materials are shown as tiny globules 14 within suspension 13, and may vary from 0.001 to 0.005 inch in diameter as in polystyrene formation at the start of the reaction, observed by ultrasonic waves in the megahertz frequency range of 3–5 MH. Obviously other sizes may be employed with this or other reactions and with suitable changes in the observation technique particularly relating to the frequency of ultrasonic waves projected therethrough and the method of detection. Differences may also occur in the size of the reaction vessel and in the size of the sampler. For the purpose of this description vessel 10 is assumed to have an inlet pipe 15 whence the reaction charge is admitted into the vessel, and a discharge tube 16 which is used for withdrawing the polystyrene product and the suspending vehicle when the reaction is complete or when it may sometimes be necessary to dump the suspension as the reaction may tend toward uncontrolled agglomeration.

Reactions of the type considered require agitation in order to maintain the dispersion or suspension and this is provided by motor and stirring means illustrated at 17. Basic control in such a reaction is by control of the suspension vehicle temperature and therefore the temperature of the suspended globules or particles. When the reaction is exothermic cooling of the suspending vehicle is required. Similarly, an endothermic reaction requires heating of the suspending medium or vehicle. Temperature control within a globule is achieved principally by maintaining the particle size within a relatively narrow range so that the heat exchange between the surface and interior of the individual globules is adequate and predictable.

Vessel 18 contains a bath 19 which may be heated by means of a circulating pipe 21, a heating coil 22 and a heat source 23, or cooled, making use of a coolant in lieu of the heat source 23. Details of the temperature control are not herein described further, inasmuch as these are conventional.

Monitoring of the reaction status of the particles in the suspension is achieved according to one embodiment of the invention by employing a sampler shown generally at 20, which is adapted to enter the reaction vessel 10 through wall 11 by means of a threaded hole 24, which is adapted to receive a threaded hollow stem 25 in which is mounted a screw-actuated retractor 26 attached to head 27, and actuated by a crank 28 or a motor drive 29 in accordance with whether the sampling is done manually under control of an operator or automatically by means of apparatus later to be described.

Figure 2:
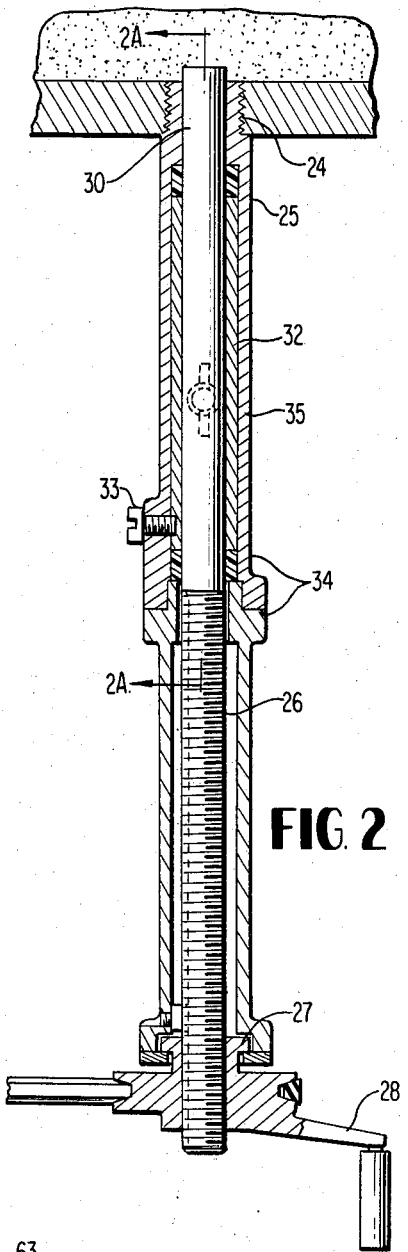
FIG. 2 is a sectional view of a sampler device for use with the vat of FIG. 1.
Figure 2A:
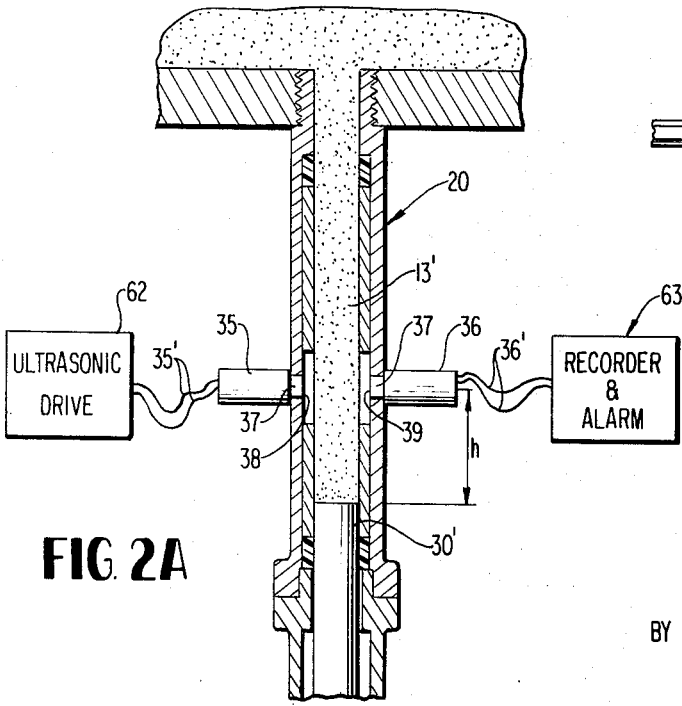
FIG. 2A is a partial sectional view of the apparatus of FIG. 2 rotated 90° and including projector and receiver ultrasonic heads in relation to the position of the withdrawn piston.

Shown more particularly in FIGS. 2 and 2A, sampler 20 comprises a piston 30 shown in the resting position wherein no sample is withdrawn at FIG. 2 and shown at 30' with the piston withdrawn in FIG. 2A in which a sample 13' of the circulating suspension 13 is held within the body of the sampler. The sampler may typically comprise a sleeve 32 mounted within the sampler and positioned by anchor screw 33 within a jointed housing 34 having head 27 thereon engaging threaded shank 26 rotated by operation of crank 28 or motor 29. It will be understood that reversing the motion of crank 28 or motor drive 29 ejects the sample from sampler 20 and prepares the sampler for receiving a new sample at the next interval of monitoring. Jointed housing 34 is convenient for disassembly and adjustment as may be required.

Along one side of sleeve 32 is a slot or aperture for receiving an ultrasonic projector 35 having leads 35' extending to a source of ultrasonic energy as at 62. In the preferred mode of operation, an ultrasonic receiver 36 is mounted opposite projector 35 and connects by leads 36' to a suitable recording device and/or alarm circuit shown generally at 63.

Piston 30 of sampler 20 fits snugly within sleeve 32 so as to avoid any retention of suspended reactant material when the piston is advanced to its normal or unactuated position. Projector 35 and receiver 36 are normally transducers of crystal type although magnetostrictive devices may be substituted. In either case a transducer operating preferably in the megahertz frequency range of 3 MH to 6MH is desirably employed for particle sizes of the order previously mentioned.

There is optionally provided between the sample and transducers 35 and 36 a coupling member 37 aligned with aperture 38 in sleeve 32 so as to provide a more effective coupling for the ultrasonic waves between the transducers and the suspension. Member 37 may include a face at 38 and a similar receiver face at 39, each being in the form of a high-frequency-responsive diaphragm. Optionally, when circumstances permit, the projector 35 and the receiver 36 may be directly exposed to the sample suspension 13' withdrawn in the sampler 30.

In one embodiment of the invention, ultrasonic heads 35 and 36 are of about ¼ inch in diameter and sleeve 32 is of about ½ inch to 1 inch diameter. The separation of heads 35 and 36, governed by sleeve diameter, is selected according to the attenuation expected by the suspension being examined. This may consist of a slurry of globules of monomer in water.

Piston 30 shown actuated or withdrawn at 30', is directly beneath threaded aperture 24, such that sleeve 32 is vertical and the top of piston 30' stands a known distance below the positions of opposite heads 35 and 36, this distance being referred to as the rise height over which a time of rise is to be measured, to provide rates of rise from which any growth in particle size may be monitored.

Whenever the particles 14 are of lesser specific gravity than the vehicle, these particles will obviously rise within sleeve 32, and, at any particular instant, an interface will form below which the suspending vehicle only will be present and above which there will be vehicle and particles. When particles are of greater specific gravity than the vehicle it will be obvious that a settling process causes the clear liquid to rise and the particles to descend in the sleeve of the sample tube. It may also be noted that particles of suspended material do not settle out when of approximately the same specific gravity as the vehicle, and a rise time can then not be obtained.

Sampler operation may be summarized as means effective for withdrawing a sample of an agitated suspension and holding the sample in a stilled condition above the bottom of a sample cavity such that an observing point at known distance from the bottom becomes a reference for determination of the passage of an interface between the clear liquid and the suspension as the stilled suspension is permitted to separate. When used for monitoring a reaction, piston 30 is withdrawn periodically to take successive samples and returned to discharge the samples, by operating crank 38 or motor 29 to withdraw the sample and by reversing the rotation of shank 26 to expell the sample and return the piston. When a sample has been withdrawn transducer 35 is then driven at a high ultrasonic frequency and any transmitted high frequency waves are detected by a transducer 36, and the intensity is recorded at 63. As an interface between a clear liquid and suspension passes the observing point the sample suddenly becomes transparent to the ultrasonic waves inasmuch as the clear liquid transmits these ultrasonic waves with little loss. Recorder 63 then detects the passing interface as a sudden change in an output signal from transducer head 36. This change is abrupt for ultrasonic waves and more suitable for automatic recording than are visual signals resulting from attenuation of light. The sampling device detects a rise time over the distance $h$, referred to as rise height for measurement, and from the rise height divided by the rise time, a rise rate is determined.

Figures 3, 3A:
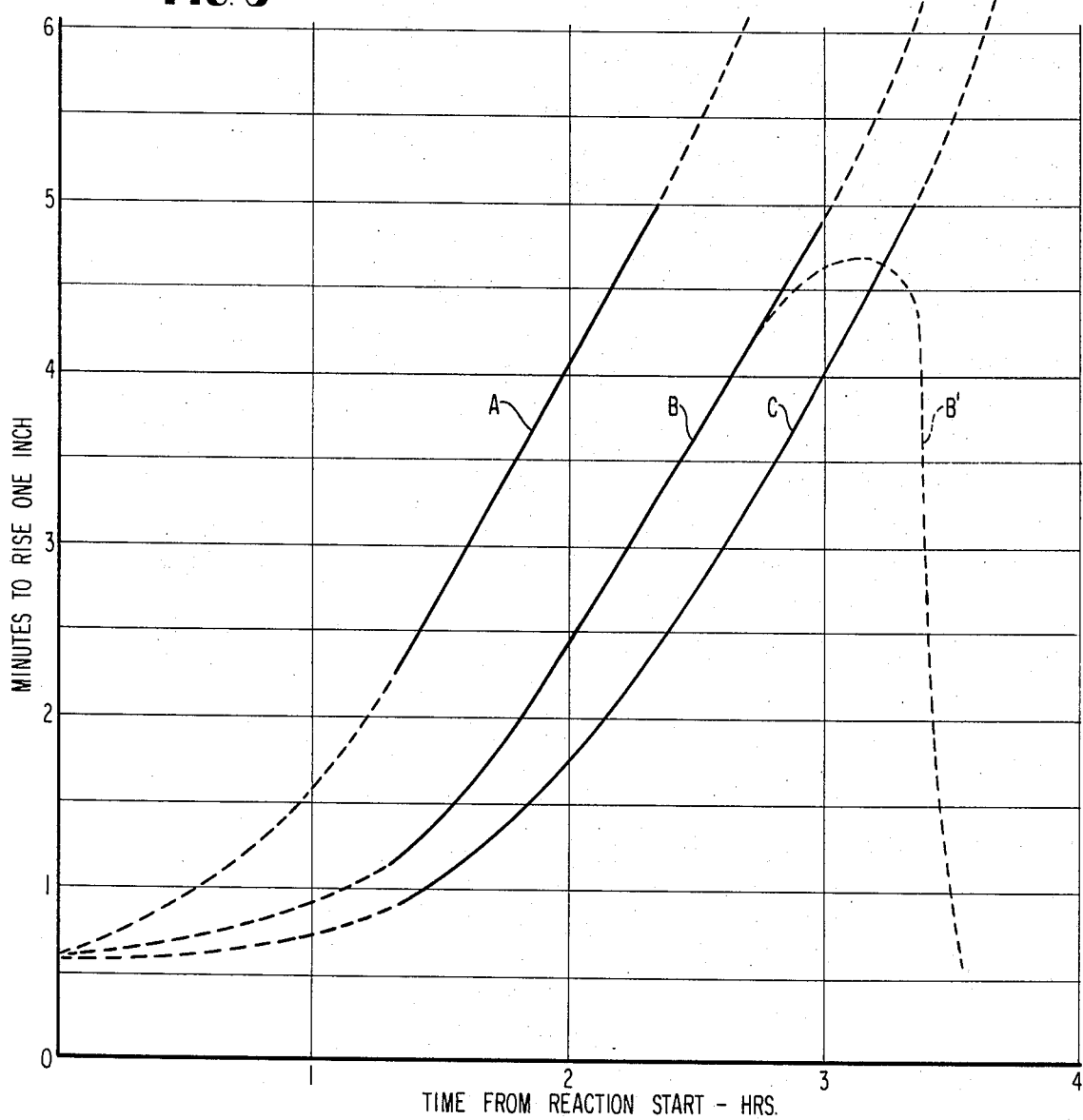
FIG. 3 shows typical plots of rise time vs. reaction time for a polymerization at three globule size distributions.
FIG. 3A shows an example of conversion percentage and specific gravity vs. reaction time typical of polymerization.

In FIG. 3 rise times for a rise height of one inch are plotted against reaction time from the start of the reaction. Curves A, B and C represent rise times and rise rates for three typical samples of a dispersion of monomer globules in water such as in the manufacture of polystyrene from a styrene monomer. It will be observed that the rise time for particles in curves A, B and C are quite different, attributed principally to differing average size of globules in the three samples for which the data is plotted in FIG. 3 in which curve A represents a sample having globules of a median particle diameter of approximately 0.002 inches, although the range of particle sizes extends considerably each side of the median value; curve B represents a sample having a median globule diameter of 0.028 inches; and curve C represents a sample having a median diameter of 0.032 inches.

It may be seen from FIG. 3 that failure to obtain a rise time for an interface within an interval of time such as 15 minutes provides a measurement of specific gravity of the globules such as to indicate near neutral buoyancy in the vehicle whether particles of a size employed for curves A, B or C may have been involved in the reaction. Also shown in FIG. 3 is an example of suspension failure in which curve B' represents the condition of excessive agglomeration of polymerizing globules due to failure to keep the globules separated during the interval when they are semisolid and most likely to stick together. As long as the globules are oily in consistency, usually up to about two hours, they will not sufficiently adhere to one another to prevent separation by agitation of the suspension. As the reaction proceeds, the consistency of the globules becomes more tacky, and at about 3 hours from start, there is danger of agglomeration. There is thus illustrated at B' a departure from curve B in which the reaction has become too rapid or the suspension has failed such that the globules agglomerate irreversibly. When this occurs it becomes uncontrolled and irreversible and the batch is about to fail. An indication of curve reversal is accordingly an indication that thermal run-away may have already commenced, in the large globules, so that the batch should be dumped before the reaction vessel is disabled.

FIG. 3A shows an approximate relationship for a typical styrene monomer-polymer reaction wherein the percent conversion is plotted as the ordinate against the time from start in hours at curve D, which thus represents percentage of solids as converted from the liquid phase. Curve E represents specific gravity plotted as ordinate at the right of the diagram against time after start of the reaction. At a specific gravity of about 1.05 the conversion is assumed to be essentially complete, wherein the globules of the suspension have been converted to solid beads which are the desired product. When the specific gravity approaches 1.00, the percent solids is high enough that the semisolid beads no longer agglomerate. Rise time measurements are effective indications for the portion of the reaction time when agglomeration endangers the batch and the vessel.

Figure 6:
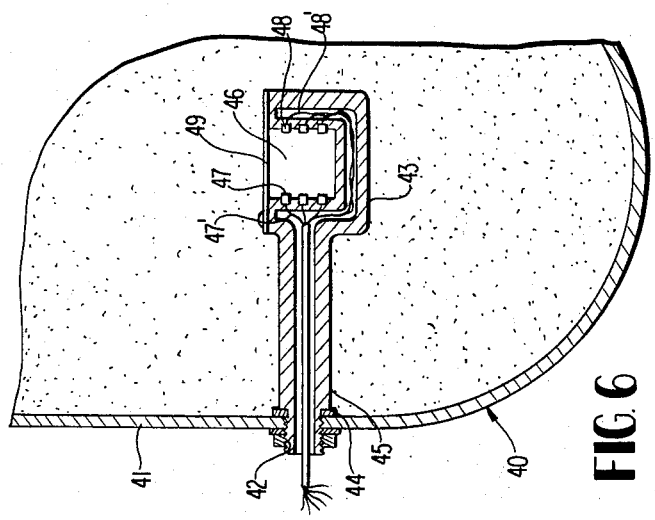
FIG. 6 shows an alternative form of probe for a large vessel in an automated system.

Method and apparatus for determining stability of a suspension and a tendency toward excessive agglomeration already described is suitable for use in vessels of moderate size. Where a large vessel is employed, an alternative form of this invention is illustrated in FIG. 6 in which vessel 40 has a wall 41 corresponding to wall 11 of FIG. 1. Wall 41 has a threaded aperture 42 into which is inserted a threaded hollow tubular probe 43 having a seal at 44 and a hollow section 45 including a well 46 disposed at the interior end thereof along two opposite sides of which are placed one or more pairs of transducers 47 and 48. Leads 47' and 48' extend to a read-out recorder or the device as in FIG. 1. Well 46 corresponds to the space between transducer heads 35 and 36 of FIG. 2A and will normally be of similar dimensions in order that ultrasonic beams admitted from a transducer 47 may reach a corresponding transducer 48 on the opposite side thereof with an appropriate degree of attenuation for a suspension and transparency for clear liquids. Although details of employment of the probe as at 43 are not disclosed, it will be appreciated that suitable sampling means will be required in order to have a stilled period during which the rise time is measured as, for example, by closing off well 46 by a lid 49 at intervals when it is desired to make a measurement and removing lid 49 to obtain a new sample as often as required. A number of transducers 47 may be arranged at different distances from the bottom of well 46 each having a receiver at a corresponding height such that several rise heights may be measured during a particular sample test.

Figure 4:
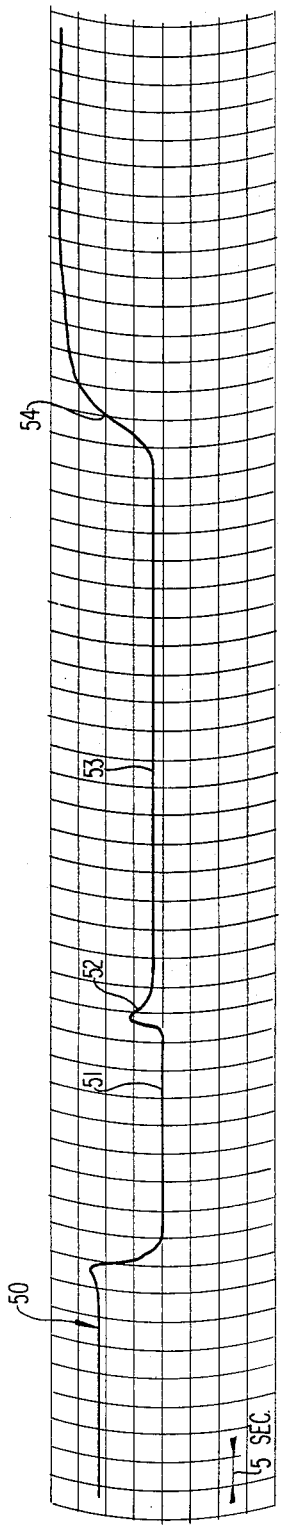
FIG. 4 shows in a time diagram a read-out from a receiving head as in FIG. 2A.

FIG. 4 illustrates a recording made of a rise time employing a sampler such as 20 wherein a trace is shown generally at 40, providing a scale zero portion 51 representing activated transducers with the piston between the transmitter and receiver. At 52 is shown a deviation in curve 50 corresponding to the passage of the piston head as the sample is being withdrawn, this indication being of no significance to the present invention. At 53 is shown that portion of the curve during which the rise time is being measured wherein the signal from transducer 35 is greatly attenuated before reaching receiver transducer 36. At 54 is shown a typical trace of the rapidly changing attenuation as the interface passes the position of transducers 35 and 36, here occurring at about two minutes after start of the measured interval. Ultrasonic beams at about 3–6 MH provide a signal which gives a very sharply defined curve tracing suitable for automatic detection and registration of a separating interface.

Figure 5:
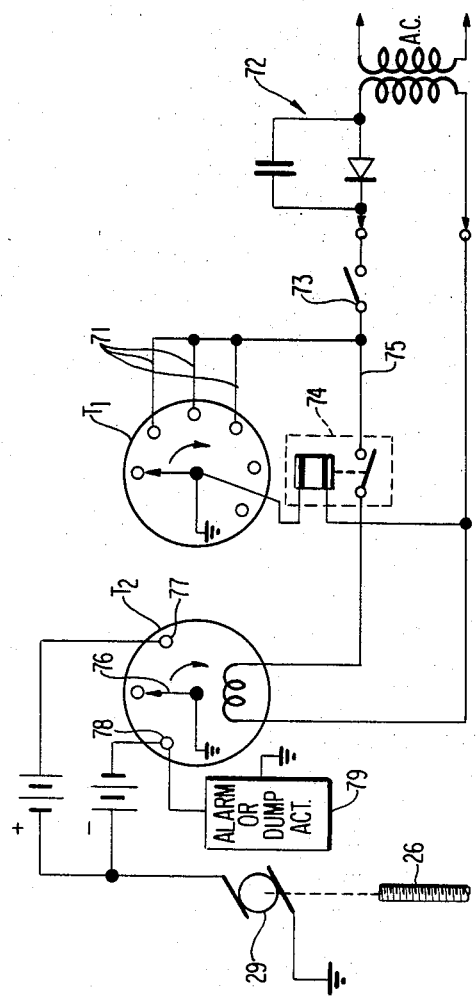
FIG. 5 is a diagrammatic sketch of electrical controls for automation of process monitoring according to this invention.

Suitable apparatus for automation of detection of rise time is shown in FIG. 5. Vessel wall 41, or its equivalent wall 11, supports a sampling device such as 20 having therein a piston as at 30 retractable in accordance with the rotation of threaded shank 26, engaging collar 27 being rotated by a drive motor 29 having a suitable reversing mechanism. Vessel 40 is provided with a timing device $T_1$ setting regularly spaced timing intervals within the overall reaction time for the batch. Leads as at 71 extend to a receiver which may be powered from a simply derived DC source generally shown at 72 by way of a switch 73 to the timer $T_2$ which serves as a sample-time-limiting relay with a time limit such as fifteen minutes. Switch 73 is a conventional activating or start switch and operates to actuate relay 74 which connects leads 71 and leads 75 to actuate timer $T_2$. DC is applied by way of switch 73, coil of relay 74, center contact of $T_1$ and the corresponding leads 71, whereby relay 74 is periodically operated to connect the power supply positive terminal to timer $T_2$, for which a negative connection to the power supply is continuous. Upon actuation of relay 74, $T_2$ operates motor 29 in a direction to withdraw piston 30 and secure a sample as lead 75 is connected to an electrical drive for $T_2$ and wiper 76 contacts terminal 77 to connect one polarity of power to motor 29. At the end of a testing period a reversing circuit is made by 76 contacting terminal 78 to drive 29 in the opposite direction. Limit switches normally employed to terminate the motion of piston 30 are not shown and may be variously located. In normal operation timer $T_2$ is reset whenever relay 74 opens and wiper 76 never reaches contact 78. If the rise time is less than a preassigned lower limit or a rise time exceeds a predetermined limit such as 15 minutes, wiper 76 contacts 78 and an alarm is sounded or visibly indicated as by circuit 79. This circuit is adapted to actuate a dump circuit, upon those times less than the lower limit, by which a valve (not shown) opens to draw the reacting material from the vessel. Alarm without dumping occurs when sampling is continued beyond the time for conversion to polymer of specific gravity approaching 1.00, e.g., 0.95, in a normally proceeding batch reaction such that very long rise times may occur. Circuit 79 includes a time-actuated disabling circuit for the dump circuit. A third timer, not shown, but normally present in the overall batch control for an automated reaction vessel, may break the circuit to the dump actuator, as at 3 hours from start, so that a good batch is not dumped.

It is to be understood that this invention can be applied to various systems of continuous phase and dispersed phase, other than polymerization in which the dispersed phase is oily globules or solid beads or particles.

What is claimed is:

1. In a process for converting globules of a monomer dispersed in an agitated suspending vehicle into a polymer, said vehicle comprising components at least partially opaque to light during portions of the process, during which conversion said globules tend to agglomerate; the method of detecting degree of agglomeration comprising the steps of
   segregating a vertically extended sample of suspended globules in a stilled space,
   projecting across said space a beam of ultrasonic radiation of wavelength for which said components are generally transparent throughout the process at a determined elevation in said space,
   detecting separation time for globules in said suspension as time elapsed during which an interface reaches said elevation, and
   indicating a predetermined degree of departure from an average separation time as a signal representative of agglomeration.

2. In a process according to claim 1, said step of indicating a departure from average separation time comprising measurement of a time interval encompassing at least the rise times for a range of globule sizes wherein said conversion to polymer does not substantially exceed 75 percent.

3. In a process according to claim 1, said step of indicating separation time including measuring a time interval substantially less than that for conversion of said monomer to a polymer, and producing thereafter a first control signal for terminating said detecting step.

4. In a process according to claim 3, said step of indicating separation time including producing a second control signal upon detecting a rise time sufficiently less than said average.

5. In a process according to claim 4, said step of indicating separation time further including producing a process altering operation in response to said second control signal.

6. In a process according to claim 1, said step of indicating departure from average separation time including producing a first control signal for recycling detection steps if a rise time is not obtained within a predetermined time limit and a second control signal for modifying said process if a rise time is obtained prior to a shorter predetermined time limit.

7. Apparatus for monitoring an aspect of the conversion of a monomer to a polymer, in a suspension comprising components at least partially opaque to light comprising, a reaction vessel charged with a suspension of particles of said monomer in a vehicle, means for agitating said suspension, means for withdrawing a sample from the region of agitation, means for supplying a beam of ultrasonic energy of a wave length for which said components are of generally constant transparency across said sample at a known elevation therein, means for receiving a signal inversely corresponding to the attenuation in said beam, and means for developing an indication of occurrence of change of magnitude of said signal as the character of suspension in said beam changes.

8. Apparatus according to claim 7, said means for separating a sample being a pistoned cylinder opening into said vessel and said piston being moveable downwardly to provide a stilled sample during a rise time interval.

9. Apparatus according to claim 8, said means for indicating including timer means connected to indicate time from stilling the sample to said change of character.

10. Apparatus according to claim 9 including means for returning said sample to said vessel upon developing said indication or upon lapse of a predetermined time interval without developing said indication.

11. Apparatus for indicating rise time in a suspension of monomer-polymer globules in a vehicle, comprising a vessel for holding said suspension during a reaction period, a piston cylinder opening upwardly into said vessel, an actuator for retracting a piston reciprocable in said cylinder to fill said cylinder with a sample of suspension, a first transducer in the wall of said cylinder at a predetermined distance above the withdrawn piston connected to an ultrasonic source, a second transducer facing said first transducer across said sample, a timing device including an indicator of lapsed time from filling the cylinder to a predetermined change in said second transducer signal.

12. Apparatus according to claim 11 including motor drive means under control of said timer for causing operation of said actuator and reversed drive for said piston operative upon developing said change in said second transducer signal.

13. Apparatus according to claim 11 including motor drive means under control of said timer for causing operation of said actuator at the start of a rise time interval and reversed drive for said piston operative upon lapse of a predetermined period after sample withdrawal without developing a predetermined change in said second transducer signal.

* * * * *